United States Patent
Ahn

(10) Patent No.: US 6,462,678 B1
(45) Date of Patent: Oct. 8, 2002

(54) PHONETIC KOREAN HANGUL KEYBOARD SYSTEM

(76) Inventor: Matthew Y. Ahn, 801 S. Euclid St., Fullerton, CA (US) 92832

( * ) Notice: Subject to any disclaimer, the term of this patent is extended or adjusted under 35 U.S.C. 154(b) by 0 days.

(21) Appl. No.: 09/534,031

(22) Filed: Mar. 24, 2000

(51) Int. Cl.[7] .............................................. H03M 11/00
(52) U.S. Cl. ..................... 341/28; 345/171; 345/703; 400/110
(58) Field of Search ............................ 341/20, 22, 28; 345/171, 703; 400/109, 110, 484

(56) References Cited

U.S. PATENT DOCUMENTS

| | | | | |
|---|---|---|---|---|
| 4,270,022 A | * | 5/1981 | Loh | 178/30 |
| 4,602,878 A | * | 7/1986 | Merner et al. | 400/110 |
| 5,187,480 A | * | 2/1993 | Thomas et al. | 341/22 |
| 5,307,267 A | * | 4/1994 | Yang | 707/535 |
| 5,387,042 A | * | 2/1995 | Brown | 345/171 |
| 5,724,031 A | * | 3/1998 | Huang | 341/28 |
| 5,945,928 A | * | 8/1999 | Kushler et al. | 341/22 |
| 6,300,934 B1 | * | 10/2001 | Ko et al. | 345/467 |

* cited by examiner

*Primary Examiner*—Michael Horabik
*Assistant Examiner*—Albert K. Wong
(74) *Attorney, Agent, or Firm*—John K. Park; Park & Sutton LLP

(57) ABSTRACT

A phonetic Korean Hangul keyboard system comprises a keyboard having an upper row, a middle row, and a bottom row. The upper row has a left upper section and a right upper section, the middle row has a left middle section and a right middle section, and the bottom row has a left bottom section and a right bottom section. The left upper section has at least five key faces and the left middle section has at least five key faces such that more than ten basic Korean consonants are distributed along the left upper and the left middle key faces. The right upper section has at least five key faces and the right middle section has at least five key faces such that more than seven basic Korean vowels are distributed along the right upper and the right middle key faces. The left bottom section has at least five key faces and the right bottom section has at least five key faces such that more than ten basic Korean consonants are distributed along the left bottom and the right bottom key faces.

19 Claims, 2 Drawing Sheets

Korean Hangul Alphabets

| Basic Consonants | ㄱ, ㄴ, ㄷ, ㄹ, ㅁ, ㅂ, ㅅ, ㅇ, ㅈ, ㅊ, ㅋ, ㅌ, ㅍ, ㅎ |
|---|---|
| Combination Consonants | ㄲ, ㄸ, ㅃ, ㅆ, ㅉ, ㄵ, ㄶ, ㄺ, ㄽ, ㅄ.... |
| Basic Vowels | ㅏ, ㅑ, ㅓ, ㅕ, ㅗ, ㅛ, ㅜ, ㅠ, ㅡ, ㅣ |
| Combination Vowels | ㅐ, ㅒ, ㅔ, ㅖ, ㅘ, ㅙ, ㅚ, ㅝ, ㅞ, ㅟ, ㅢ |
| Archaic Alphabets: three consonants (ㆆ, ㆁ, ㅿ) and one vowel ( ˙ ) | |

| Horizontal Alignment | ㄱ + ㅏ → 가 |
|---|---|
| Vertical Alignment | ㅌ + ㅗ + ㅇ → 통 |
| Horizontal and Vertical Alignment | ㅍ + ㅏ + ㄴ → 판 |

PHONETIC KOREAN HANGUL KEYBOARD SYSTEM

BACKGROUND OF THE INVENTION

The present invention relates to a phonetic Korean keyboard system. More particularly, the present invention relates to an innovative phonetic Korean Hangul keyboard system for a computerized keyboard which improves typing efficiency while significantly relieving finger fatigue during manual data input operation.

Hangul is a phonetic writing system used by more than, 70 million people in South Korea, North Korea and their immigrant communities in other countries. A 28-alphabet Hangul system was created by King Sejong (a fourth King of Chosun Dynasty that lasted 1392 to 1910 on Korea Peninsula) and his scholars in 1443. Four of the Hangul alphabets are no more in use so modern Hangul has 24 phonetic alphabets including 14 basic consonants and 10 basic vowels.

Although Hangul has only 24 basic phonetic alphabets even less than 26 English alphabets, Hangul reserves complication in a syllabic assembly. In order to assemble a readable and meaningful Hangul syllable character, the selected Hangul alphabets should be aligned in a vertical and horizontal order. For example, three Hangul alphabets of " ㅏㄴ" are assembled to a syllabic Hangul character "한" according to a required order. Each syllabic Hangul character may look much closer to a Chinese character than to an English word which adopts a horizontal alignment of alphabets. Notwithstanding, each Hangul character belongs to a phonetic language system because it simply consists of 24 basic phonetic alphabets.

In view of typing, Hangul has a further complication since two or three Hangul alphabets incorporate a plurality of combination alphabets in different size and sometimes in different location. So a Hangul alphabet assembly to an individual character requires more than one set of Hangul alphabets because each size and shape of the alphabets should be different to fit within each of near-square Hangul syllable characters. That is, a Hangul consonant ㄱ should be different in size and shape when placed within Hangul syllables such as "가", "갈" and "학". For this reason, a computer requires multiple sets of Hangul alphabets to accomodate those variations of Hangul syllabic characters.

Each Hangul syllable character consists of an initial portion such as "ㅎ" of "ㄱ" a central portion such as "ㅏ" of "학", and a final portion such as "ㄱ" of "학". Or Hangul syllable character can also be assembled of an inital portion and a central portion without a final portion, as shown in "가". In this circumstance, when typing into a computer the near-square Hangul syllables using a Korean Standard Hangul Keyboard (KS C 5715) laid out in 1969, the Hangul alphabet has to jump around on the computer screen in response to each new alphabet input so that a visual confusion has been inevitable until the final portion is typed in.

Specifically, when a consonant alphabet is typed after a vowel, the consonant goes under the vowel, and when another vowel comes after this consonant, the vowel jumps over the top of the vowel. Or this consonant attaches to the left side of the bowel if it is a vertically shaped vowel. The mingling of a consonant and a final portion creates such a visual on-screen confusion.

In further review of the Korean Standard Hangul Keyboard (KS C 5715), it should be understood that the 26-key Hangul keyboard standardized by Korean government in 1969 was a simple adoption of the Dvorak system, which became another American English keyboard standard in 1982. Contrary to the traditional Qwerty system, which has vowels all over the places, the Dvorak system has all vowels on the left side of the keyboard. Similarly, all ten vowels on the Korean Standard Hangul keyboard are located on the right hand position except one.

A disadvantage of the first Hangul keyboard was a slowness in typing speed, resulting from the mingling of a consonant and a final portion of a Hangul character. The consonant to be placed in the final portion of a Hangul character needs to be separately typed.

Compared to English typing, Hangul alphabets typed in under the KS C 5175 should be encoded and decoded to appear on the screen in form of a Hangul syllabic character. Further, the assembled syllabic Hangul character has to find a required code number for the appropriate output Hangul font while occupying thousands of code spaces. Also, the KS C 5175 does not include four archaic Hangul alphabets. Also, the standard keyboard requires left hand fingers for both consonants and final portions, where left hand work is almost 50% as much as that of the right hand, thereby further incurring finger fatigue and mis-typing.

Most Hangul software programs currently provide two keyboard systems to chose from. One is called a two set system (Korean standard KS C 6175 mentioned above) and the other is called a three set system (named so because it has initial consonants, central vowels and final consonants) which was originally invented by Dr. Kong Byungwoo in 1949 solely for typewriter use. Despite the fact that this system became non-standard since 1969, people loved to use the typewriter with this three set system.

The Kong system had several keyboard arrangements in the past, mainly due to different typewriter configurations. However, most computer softwares now have a 52 key system so the arrangements of Kong loses its base. Also, it takes a longer time period to remember which Hangul alphabet is located where.

In the syllabic character writing, an initial consonant comes on the left or on top of vowel, and the final consonant comes always under the initial consonant and the vowel. However, under Kong's keyboard arrangement, the initial consonant comes on the right, the vowel comes in the middle and the final consonant on the left. This arrangement is easy to cause a visual confusion. The Kong system also places some of the alphabets on the top row currently being used for numbers and this further slows the input speed. This is the main reason why the Kong system is not used as the standardized simultaneous syllabic character input system.

Further, in the Kong system, left hand fingers are overused. Since all the keys for centrals and finals are located on the left and therefore left hand fingers have to work about 60%, while right hand fingers work only about 40%. In addition, 8 consonants for finals with a usage frequency of 5.8% are located for the left hand little finger while the little finger still requires to use the shift key. The Kong system requires thirteen Hangul alphabets use the shift key.

SUMMARY OF THE INVENTION

The present invention is contrived to overcome the conventional disadvantages. Therefore, it is an object of the present invention to provide a phonetic Hangul keyboard system which enables a faster character input by a relocation of Hangul alphabet keys in correspondence to a statistical efficiency.

Another object of the present invention is to enable a faster memorization of Hangul alphabet keys on the keyboard by laying out the keys categorized in similar sound groups and same finger repetitions.

Still another object of the present invention is to provide the Hangul keyboard system convertible to any of the existing Hangul keyboard softwares without requiring mechanical alteration.

In order to achieve the above-described objects, the phonetic Korean Hangul keyboard system according to the present invention comprises a keyboard having an upper row, a middle row, and a bottom row. The upper row has a left upper section and a right upper section, the middle row has a left middle section and a right middle section, and the bottom row has a left bottom section and a right bottom section.

The left upper section has at least five key faces and the left middle section has at least five key faces such that more than ten basic Korean consonants are distributed along the left upper and the left middle key faces. The right upper section has at least five key faces and the right middle section has at least five key faces such that more than seven basic Korean vowels are distributed along the right upper and the right middle key faces. Alternately, the right upper section may have four key faces and the right middle section may have six key faces such that all ten basic Korean vowels are distributed along the right upper and the right middle key faces and exclusively used to indicate a central portion of a Korean syllable. Also, the left bottom section has at least five key faces and the right bottom section has at least five key faces such that more than ten basic Korean consonants are distributed along the left bottom and the right bottom key faces.

All fourteen basic Korean consonants are distributed both along the left upper and the left middle key faces along the left bottom and the right bottom key faces. All the ten basic Korean vowels are distributed along the right upper and the right middle key faces. The left upper section and the left middle section may further comprise combination Korean consonants distributed along the left upper and the left middle key faces. The right upper section and the right middle section may further comprise combination Korean vowels distributed along the right upper and the right middle key faces. The left bottom section and the right bottom section may comprises combination Korean consonants distributed along the left bottom and the right bottom key faces.

For a better performance, the Korean consonants distributed along the left upper and the left middle key faces are exclusively used to indicate an initial portion of a Korean syllable, the Korean vowels distributed along the right upper and the right middle key faces are exclusively used to indicate a central portion of a Korean syllable, and the Korean consonants distributed along the left bottom and the right bottom key faces are exclusively used to indicate a final portion of a Korean syllable.

The Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, and wherein ㅊ, ㅋ, ㅌ, and ㅍ are to be used with a shift key. The Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, ㅎ, ㄲ, ㄸ, ㅃ, ㅆ, and , and wherein ㅊ, ㅋ, ㅌ, ㅍ, ㄲ, ㄸ, ㅃ, ㅆ, and are to be used with a shift key.

Also, the Korean consonants distributed along the left upper key faces are ㅁ, ㅅ, ㄴ, ㄹ, and ㅎ in a left-to-right order, wherein the Korean consonants distributed along the left middle key faces are ㅂ, ㅈ, ㄷ, ㄱ, and ㅇ, and wherein ㅍ, ㅊ, ㅋ, and ㅌ correspondingly share their key faces with ㅂ, ㅈ, ㄷ, and ㄱ such that the respective ㅍ, ㅊ, ㅌ, and ㅋ are to be used with a shift key. The Korean vowels distributed along the right upper key faces are ㅏ, ㅓ, ㅗ, and ㅜ in a left-to-right order and the Korean vowels distributed along the right middle key faces are ㅡ, ㅣ, ㅑ, ㅕ, ㅛ, and ㅠ in a left-to-right order.

The Korean consonants distributed along the bottom left and bottom right key faces are ㅂ, ㅈ, ㄷ, ㄱ, ㅇ, ㅅ, ㅆ, ㄹ, ㅁ, and ㅎ in a left-to-right order, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key. Selectively, three archaic Korean Hangul consonants ㆆ, ㆁ, ㅿ, and one archaic Korean Hangul vowel are selectively distributed along the key faces to be used with a shift key.

The advantages of the phonetic Korean Hangul keyboard system are numerous. Initially, the phonetic Hangul keyboard system realizes a faster character input by relocation of Hangul alphabet keys in correspondence to a statistical efficiency and by enabling both a serial input (one by one input) and a simultaneous input (two or more keys input at the same time), thereby fully maximizing the merits of the three-set Hangul input system.

The present invention enables a faster memory of the Hangul keyboard by categorizing the Hangul alphabets in accordance with similar sound groups, by symmetrically repeating those keys of the left upper section on the right bottom section, and by identically repeating those keys of the left middle section on the left bottom section.

Further, the Hangul keyboard system is perfectly convertible with any of the existing Hangul keyboard softwares without requiring mechanical alteration, thereby improving usability and reliability.

Still further, the keyboard system saves a large amount of code spaces by adopting the three-set Hangul mechanism, thereby allowing the currently occupying several thousands of code spaces in ISO 2022 and ISO 60646 to be reserved for other languages such as Chinese and Japanese which require more code spaces. Also, the keyboard system substantially overcomes the conventional Hangul typing which urges more labor on left hand fingers than on right hand fingers, by allowing fingers of both hands to be equally used while increasing frequency of index finger usage.

Although the present invention is briefly summarized, he fuller understanding of the invention can be obtained by the following drawings, detailed description and appended claims.

BRIEF DESCRIPTION OF THE DRAWINGS

The present invention will be better understood with reference to the accompanying drawings, wherein.

DETAILED DESCRIPTION OF THE PREFERRED EMBODIMENTS

Figure 1:
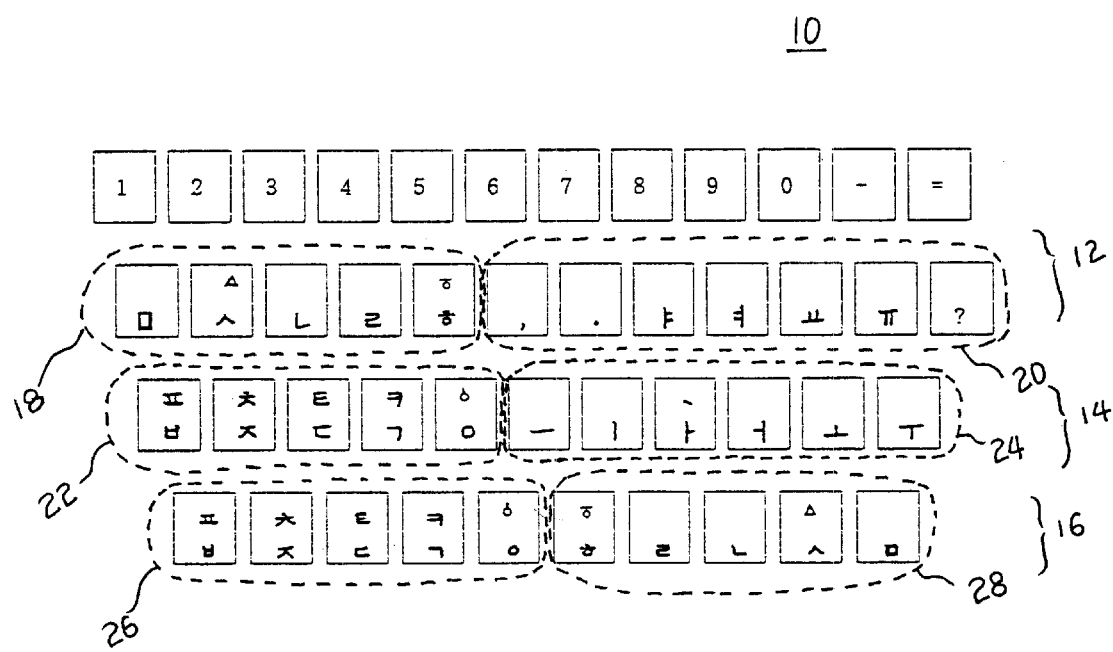
FIG. 1 is a view showing a phonetic Korean Hangul keyboard system according to the present invention.

As shown in FIG. 1, a phonetic Korean Hangul keyboard system 10 for a computerized keyboard according to the present invention comprises an upper row 12, a middle row 14 positioned below the upper row 12, and a bottom row 16 positioned below the middle row 14. The upper row 12 has a left upper section 18 and a right upper section 20. The middle row 14 has a left middle section 22 and a right middle section 24. The bottom row 16 has a left bottom section 26 and a right botton section 28. Each of the sections 18, 20, 22, 24, 26, 28 has a plurality of key faces.

Figures 2, 3, 4:
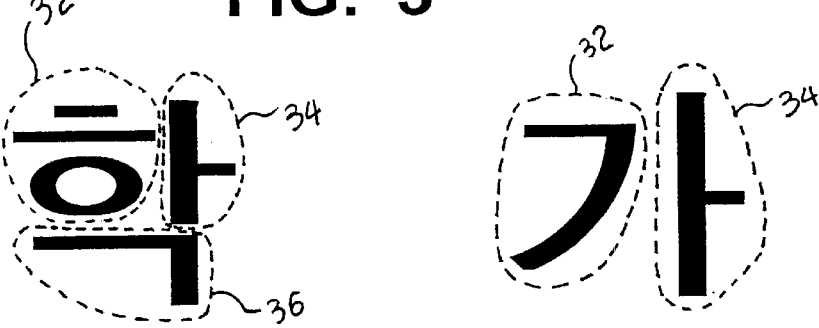
FIG. 2 is a table showing categories of phonetic Korean Hangul alphabets.
FIG. 3 is a view showing syllabic Hangul characters.
FIG. 4 is a view showing respective configurations of syllabic Hangul characters.

Referring to FIG. 2, the modern phonetic Korean Hangul includes fourteen (14) basic consonants, more than ten (10) combination consonants, ten (10) basic vowels, and eleven (11) combination vowels. In addition to the modern Hangul, the archaic Hangul alphabets further include three consonants and one vowel.

The basic consonants have a 1st consonant (ㄱ), a 2nd consonant (ㄴ), a 3rd consonant (ㄷ) a 4th consonant (ㄹ), a 5th consonant (ㅁ), a 6th consonant (ㅂ), a 7th consonant (ㅅ), an 8th consonant (ㅇ), a 9th consonant (ㅈ), a 10th consonant (ㅊ), an 11th consonant (ㅋ), a 12th consonant (ㅌ), a 13th consonant (ㅍ) and a 14th consonant (ㅎ). The basic vowels have a 1st vowel (ㅏ), a 2nd vowel (ㅑ), a 3rd vowel (ㅓ), a 4th vowel (ㅕ), a 5th vowel (ㅗ), a 6th vowel (ㅛ), a 7th vowel (ㅜ), a 8th vowel (ㅠ), a 9th vowel (ㅡ) and a 10th vowel (ㅣ). The combination consonants are formed horizontally combining two of the basic consonants, and the combination vowels are formed horizontally combining two or three of the basic vowels.

As further shown in FIG. 3, a syllabic Hangul character may have two formations; one with an initial portion 32, a central portion 34 and a final portion 36, and the other with only the initial portion 32 and the central portion 34. The assembly of the initial portion, the central portion and the final portion to incorporate one syllabic Hangul character follows three different rules. As shown in FIG. 4, the syllabic Hangul character may be formed in a horizontal alignment, a vertical alignment, or a horizontal and vertical alignment of selected Hangul alphabets.

Specifically, in the horizontal alignment, either a basic consonant or a combination consonant becomes the initial portion, and either a basic vowel or a combination vowel becomes the central portion of a syllabic Hangul character. In the vertical alignment, either a basic consonant or a combination consonant becomes the initial portion, and either a basic vowel or a combination vowel becomes the central portion, and then either a basic consonant or a combination consonant becomes the final portion, wherein the vertical alignment may also be formed without the final portion. A syllabic Hangul character in the horizontal and vertical alignment is a combination of the horizontal alignment and the vertical alignment.

In FIG. 4, an exemplary Hangul syllable character "가" is incorporated in horizontal combination of the 1st consonant (ㄱ) and the 1st vowel (ㅏ). Another exemplary Hangul syllable character "동" is incorporated in vertical combination of the 12th consonant (ㅌ), the 5th vowel (ㅗ), and the 8th consonant (ㅇ). Still another exemplary Hangul syllable character "꽌" is incorporated in vertical and horizontal combination of the 13th consonant (ㅍ), the 1st vowel (ㅏ) and the 2nd consonant (ㄴ).

As shown back in FIG. 1, the left upper section 18 has at least five key faces 18-1 ... 18-5 and the left middle section 22 has at least five key faces 22-1 ... 22-5 such that more than ten basic Korean consonants are distributed along the left upper key faces 18-1 ... 18-5 and the left middle key faces 22-1 ... 22-5. The right upper section 20 has at least five key faces 20-1 ... 20-5 and the right middle section 22 has at least five key faces 22-1 ... 22-5 such that more than seven basic Korean vowels are distributed along the right upper and the right middle key faces. Selectively, the right upper section 20 may have four key faces and the right middle section 22 may have six key faces such that all the ten basic Korean vowels may be distributed along the right upper and the right middle key faces. Also, the left bottom section 26 has at least five key faces 26-1 ... 26-5 and the right bottom section 28 has at least five key faces 28-1 ... 28-5 such that more than ten basic Korean consonants are distributed along the left bottom and the right bottom key faces 26-1 ... 26-5 and 28-1 ... 28-5.

In a preferred version, all the fourteen basic Korean consonants are distributed along the left upper and the left middle key faces 18-1 ... 18-5 and 22-1 ... 22-5, and along the left bottom and the right bottom key faces 26-1 ... 26-5 and 28-1 ... 28-5. The Korean consonants distributed along the left upper and the left middle key faces are exclusively used to indicate an initial portion of a Korean syllable. Also, all the ten basic Korean vowels are distributed along the right upper and the right middle key faces 20-1 ... 20-5 and 24-1 ... 24-5.

In this construction, each of the right upper section 20 and the right middle section 24 may also comprise combination Korean consonants distributed along the left upper and the left middle key faces 18-1 ... 18-5 and 22-1 ... 22-5, and each of the left bottom section 26 and the right bottom section 28 may further comprise combination Korean consonants distributed along the left bottom and the right bottom key faces 26-1 ... 26-5 and 28-1 ... 28-5. The Korean vowels distributed along the right upper and the right middle key faces are exclusively used to indicate a central portion of a Korean syllable, and the consonants distributed along the left bottom and the right bottom key faces are exclusively used to indicate a final portion of a Korean syllable.

The Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, and ㅎ, wherein ㅊ, ㅋ, ㅌ, and ㅍ are to be used with a shift key. The Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, ㅎ, ㄲ, ㄸ, ㅃ, ㅆ, and , wherein ㅊ, ㅋ, ㅌ, ㅍ, ㅎ, ㄲ, ㄸ, ㅃ, ㅆ, and are to be used with a shift key.

In an embodiment, the Korean consonants distributed along the left upper key faces are ㅁ, ㅅ, ㄴ, ㄹ, and ㅎ in a left-to-right order. The Korean consonants distributed along the left middle key faces are ㅂ, ㅈ, ㄷ, ㄱ, and ㅇ in a left-to-right order, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key. Also, the Korean consonants distributed along the bottom left and bottom right key faces are ㅂ, ㅈ, ㄷ, ㄱ, ㅇ, ㅅ, ㄴ, ㄹ, ㅁ, and ㅎ in a left-to-right order, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key.

Meanwhile, the Korean vowels distributed along the right upper key faces are ㅏ, ㅓ, ㅗ and ㅠ in a left-to-right order and the Korean vowels distributed along the right middle key faces are ㅡ, ㅣ, ㅏ, ㅓ, ㅗ, and ㅜ in a left-to-right order. Selectively, the three archaic Korean Hangul consonants ㆆ, ㆁ, ㅿ, and one archaic Korean Hangul vowel may be distributed along the key faces to be used with a shift key.

As discussed above, the Hangul keyboard system according to the present invention relocates Hangul alphabet keys on the basis of the three-set Hangul mechanism which distinguishes the Hangul consonants for the initial portions from those for the final portions of Hangul characters.

The advantages of the phonetic Korean Hangul keyboard system are numerous. First, the phonetic Hangul keyboard system realizes a faster character input by relocation of Hangul alphabet keys in correspondence to a statistical efficiency and by enabling both a serial input (one by one input) and a simultaneous input (two or more keys input at the same time), thereby fully maximizing the merits of the three-set Hangul input system.

Second, the present invention enables a faster memory of the Hangul keyboard by categorizing the Hangul alphabets in accordance with similar sound groups, by symmetrically repeating those keys of the left upper section on the right bottom section, and by identically repeating those keys of the left middle section on the left bottom section.

Third, the Hangul keyboard system is perfectly convertible with any of the existing Hangul keyboard softwares without requiring mechanical alteration, thereby improving usability and reliability.

Fourth, the keyboard system saves a large amount of code spaces by adopting the three-set Hangul mechanism, thereby allowing the currently occupying several thousands of code spaces in ISO 2022 and ISO 60646 to be reserved for other languages such as Chinese and Japanese which require more code spaces.

Fifth, the keyboard system substantially overcomes the conventional Hangul typing which urges more labor on left hand fingers than on right hand fingers, by allowing fingers of both hands to be equally used while increasing frequency of index finger usage.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A phonetic Korean Hangul keyboard system comprising a keyboard having an upper row, a middle row, and a bottom row, wherein the upper row has a left upper section and a right upper section, wherein the middle row has a left middle section and a right middle section, and wherein the bottom row has a left bottom section and a right bottom section, wherein:
   a) the left upper section has at least five key faces and the left middle section has at least five key faces such that more than ten basic Korean consonants are distributed along the left upper and the left middle key faces;
   b) the right upper section has at least five key faces and the right middle section has at least five key faces such that more than seven basic Korean vowels are distributed along the right upper and the right middle key faces; and
   c) the left bottom section has at least five key faces and the right bottom section has at least five key faces such that more than ten basic Korean consonants are distributed along the left bottom and the right bottom key faces.

2. The phonetic Korean Hangul keyboard system of claim 1 wherein all fourteen basic Korean consonants are distributed along the left upper and the left middle key faces.

3. The phonetic Korean Hangul keyboard system of claim 2 wherein the left upper section and the left middle section further comprises of combination Korean consonants distributed along the left upper and the left middle key faces.

4. The phonetic Korean Hangul keyboard system of claim 1 wherein all ten basic Korean vowels are distributed along the right upper and the right middle key faces.

5. The phonetic Korean Hangul keyboard system of claim 4 wherein the right upper section and the right middle section further comprises of combination Korean vowels distributed along the right upper and the right middle key faces.

6. The phonetic Korean Hangul keyboard system of claim 1 wherein all fourteen basic Korean consonants are distributed along the left bottom and the right bottom key faces.

7. The phonetic Korean Hangul keyboard system of claim 6 wherein the left bottom section and the right bottom section further comprises of combination Korean consonants distributed along the left bottom and the right bottom key faces.

8. The phonetic Korean Hangul keyboard system of claim 3 wherein the Korean consonants distributed along the left upper and the left middle key faces are exclusively used to indicate an initial portion of a Korean syllable.

9. The phonetic Korean Hangul keyboard system of claim 5 wherein the Korean vowels distributed along the right upper and the right middle key faces are exclusively used to indicate a central portion of a Korean syllable.

10. The phonetic Korean Hangul keyboard system of claim 7 wherein the Korean consonants distributed along the left bottom and the right bottom key faces are exclusively used to indicate a final portion of a Korean syllable.

11. The phonetic Korean Hangul keyboard system of claim 8 wherein the Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, and ㅎ, and wherein ㅊ, ㅋ, ㅌ, and ㅍ are to be used with a shift key.

12. The phonetic Korean Hangul keyboard system of claim 8 wherein the Korean consonants distributed along the left upper and the left middle key faces are ㄱ, ㄴ, ㄷ, ㄹ, ㅁ, ㅂ, ㅅ, ㅇ, ㅈ, ㅊ, ㅋ, ㅌ, ㅍ, ㅎ, ㄲ, ㄸ, ㅃ, ㅆ, and , and wherein ㅊ, ㅋ, ㅌ, ㅍ, ㅎ, ㄲ, ㄸ, ㅃ, ㅆ, and are to be used with a shift key.

13. The phonetic Korean Hangul keyboard system of claim 11 wherein the Korean consonants distributed along the left upper key faces are ㅁ, ㅅ, ㄴ, ㄹ, and ㅎ in a left-to-right order, wherein the Korean consonants distributed along the left middle key faces are ㅂ, ㅈ, ㄷ, ㄱ, and ㅇ, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key.

14. The phonetic Korean Hangul keyboard system of claim 9 wherein the Korean vowels distributed along the right upper key faces ㅏ, ㅓ, ㅗ, and ㅠ in a left-to-right order and the Korean vowels distributed along the right middle key faces are ㅡ, ㅣ, ㅏ, ㅓ, ㅗ, and ㅜ in a left-to-right order.

15. The phonetic Korean Hangul keyboard system of claim 10 wherein the Korean consonants distributed along the bottom left and bottom right key faces are ㅂ, ㅈ, ㄷ, ㄱ, ㅇ, ㅎ, ㄹ, ㄴ, ㅅ, and ㅁ in a left-to-right order, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key.

16. The phonetic Korean Hangul keyboard system of claim 1 wherein three archaic Korean Hangul consonants and one archaic Korean Hangul vowel are selectively distributed along the key faces to be used with a shift key.

17. The phonetic Korean Hangul keyboard system of claim 16 wherein three archaic Korean Hangul consonants are ㆆ, ㆁ, ㅿ, and wherein one archaic Korean Hangul vowel is ㆍ.

18. A phonetic Korean Hangul keyboard system comprising a keyboard having an upper row, a middle row, and a bottom row, wherein the upper row has a left upper section and a right upper section, wherein the middle row has a left middle section and a right middle section, and wherein the bottom row has a left bottom section and a right bottom section, wherein:

a) the left upper section has at least five key faces and the left middle section has at least five key faces such that all fourteen basic Korean consonants are distributed along the left upper and the left middle key faces and exclusively used to indicate an initial portion of a Korean syllable, wherein the Korean consonants distributed along the left upper key faces are ㅁ, ㅅ, ㄴ, ㄹ, and ㅎ in a left-to-right order, wherein the Korean consonants distributed along the left middle key faces are ㅂ, ㅈ, ㄷ, ㄱ, and ㅇ, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are tobe used with a shift key;

b) the right upper section has at least five key faces and the right middle section has at least five key faces such that all ten basic Korean vowels are distributed along the right upper and the right middle key faces and exclusively used to indicate a central portion of a Korean syllable, the Korean vowels distributed along the right upper key faces ㅏ, ㅓ, ㅗ, and ㅠ in a left-to-right order and the Korean vowels distributed along the right middle key faces are ㅡ, ㅣ, ㅏ, ㅓ, ㅗ, and ㅜ in a left-to-right order;

c) the left bottom section has at least five key faces and the right bottom section has at least five key faces such that all the fourteen basic Korean consonants are distributed along the left bottom and the right bottom key faces and exclusively used to indicate a final portion of a Korean syllable, wherein the Korean consonants distributed along the left and right bottom key faces are in ㅂ, ㅈ, ㄷ, ㄱ, ㅇ, ㅎ, ㄹ, ㄴ, ㅅ, and ㅁ in a left-to-right order, wherein ㅍ, ㅊ, ㅌ, and ㅋ correspondingly share their key faces with ㅂ, ㅈ, ㄷ, and ㄱ such that the respective ㅍ, ㅊ, ㅌ, and ㅋ are to be used with a shift key.

19. The phonetic Korean Hangul keyboard system of claim 18, wherein the left upper section and the left middle ection further comprise combination Korean consonants distributed along the left upper and the left middle key faces.

* * * * *